(12) United States Patent
Mohandas et al.

(10) Patent No.: US 8,488,608 B2
(45) Date of Patent: Jul. 16, 2013

(54) SYSTEM AND METHOD FOR TRAFFIC DISTRIBUTION IN A MULTI-CHASSIS LINK AGGREGATION

(75) Inventors: Sindhu K. Mohandas, Thousand Oaks, CA (US); Prashant Rao, Oak Park, CA (US)

(73) Assignee: Alcatel Lucent, Paris (FR)

( * ) Notice: Subject to any disclaimer, the term of this patent is extended or adjusted under 35 U.S.C. 154(b) by 186 days.

(21) Appl. No.: 13/010,414

(22) Filed: Jan. 20, 2011

(65) Prior Publication Data
US 2012/0033669 A1 Feb. 9, 2012

Related U.S. Application Data

(60) Provisional application No. 61/370,622, filed on Aug. 4, 2010.

(51) Int. Cl.
*H04L 12/28* (2006.01)
(52) U.S. Cl.
USPC .......................................... 370/392

(58) Field of Classification Search
USPC ............ 370/217, 225, 228, 389, 392, 395.53, 370/401
See application file for complete search history.

(56) References Cited

U.S. PATENT DOCUMENTS

| 7,161,948 | B2 | 1/2007 | Sampath et al. |
| 7,173,934 | B2 | 2/2007 | Lapuh et al. |
| 7,414,979 | B1 * | 8/2008 | Jarvis ............................ 370/238 |
| 2010/0020680 | A1 * | 1/2010 | Salam et al. ................... 370/225 |
| 2012/0020373 | A1 * | 1/2012 | Subramanian et al. ....... 370/419 |

* cited by examiner

*Primary Examiner* — Jung Park
(74) *Attorney, Agent, or Firm* — Garlick & Marksion; Jessica W. Smith

(57) ABSTRACT

A pair of aggregation switches is connected to an edge node by a multi-chassis link aggregation group, wherein the aggregation switches are connected by a virtual fabric link (VFL) for exchange of information between the Aggregation Switches. The VFL includes a plurality of subsets of VFL physical links, wherein each subset is connected to a different pair of network interface modules on the Aggregation Switches. Traffic distribution across the plurality of subsets of VFL physical links is based on destination hardware device information in a pre-pended header of packets and/or based on a load balancing identifier in the pre-pended header.

20 Claims, 11 Drawing Sheets

Overview of VFL/MC-LAG

SYSTEM AND METHOD FOR TRAFFIC DISTRIBUTION IN A MULTI-CHASSIS LINK AGGREGATION

CROSS-REFERENCE TO RELATED PATENTS

The present U.S. Utility Patent Application claims priority pursuant to 35 U.S.C. §119(e) to U.S. Provisional Application Ser. No. 61/370,622, entitled, "MULTI-CHASSIS VIRTUAL-FABRIC LINK AGGREGATION SYSTEM," filed Aug. 4, 2010, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge nodes. Different types of edge networks include digital subscriber line, hybrid fiber coax (HFC) and fiber to the home. Edge nodes may perform, for example, L2 switching functions for the attached devices. The edge nodes are generally connected to an aggregate layer that terminates access links coming from multiple edge nodes. Switches residing at the aggregation layer are known as Aggregation Switches. Aggregation Switches may perform, for example, L2 switching and L3 routing of traffic received via the aggregate links from the edge nodes. The aggregate layer is connected to a metro or core network layer that performs Layer 3/IP routing of traffic received from the Aggregation Switches (in a three tier network) or from edge nodes (in a two tier network). As will be appreciated, nodes at each incremental layer of the network typically have larger capacity and faster throughput.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, less than one second) to achieve seamless transition to the alternate paths.

Ethernet protocol is a transport technology that is used ubiquitously in local area networks (LAN), such as the home and enterprise networks to communicate between computers and networks. However, the use of Ethernet protocol technology in access and aggregate networks, as well as metro networks, is continuing to rise and to revolutionize the edge network as it did the enterprise network. As an access technology, Ethernet offers significant advantages over other access technologies, such as: (i) future-proof transport for data, video and voice applications; (ii) cost-effective infrastructure for data services; and (iii) simple, globally accepted standard that will ensure interoperability.

In order to adapt Ethernet technology to a carrier-grade service environment in edge and aggregate layer networks, a number of issues remain to be addressed, including resiliency to failures. In one known solution, the spanning tree protocol (STP) is commonly used to detect failures and divert traffic to alternate paths when failures occur in Ethernet networks. Generally, STP relies on multiple physical paths between switches, but with only one path active at any one time, the other path being placed in a blocking mode (defining an "active/passive" paradigm). When failures occur, an alternative path is brought out of the blocking mode into an active state, thereby re-establishing the connection.

However, STP can result in unacceptable convergence times (e.g., up to several seconds) in some network topologies, including without limitation, convergence between edge nodes and aggregation switches of a data network. Further, STP provides only for an active/passive operation paradigm whereby not all links are actively forwarding traffic at the same time.

Accordingly, there is a need for systems and methods for providing resiliency between nodes of one or more data networks, such as without limitation, between edge nodes and aggregation switches of an Ethernet network.

DETAILED DESCRIPTION OF THE INVENTION

Figure 1:
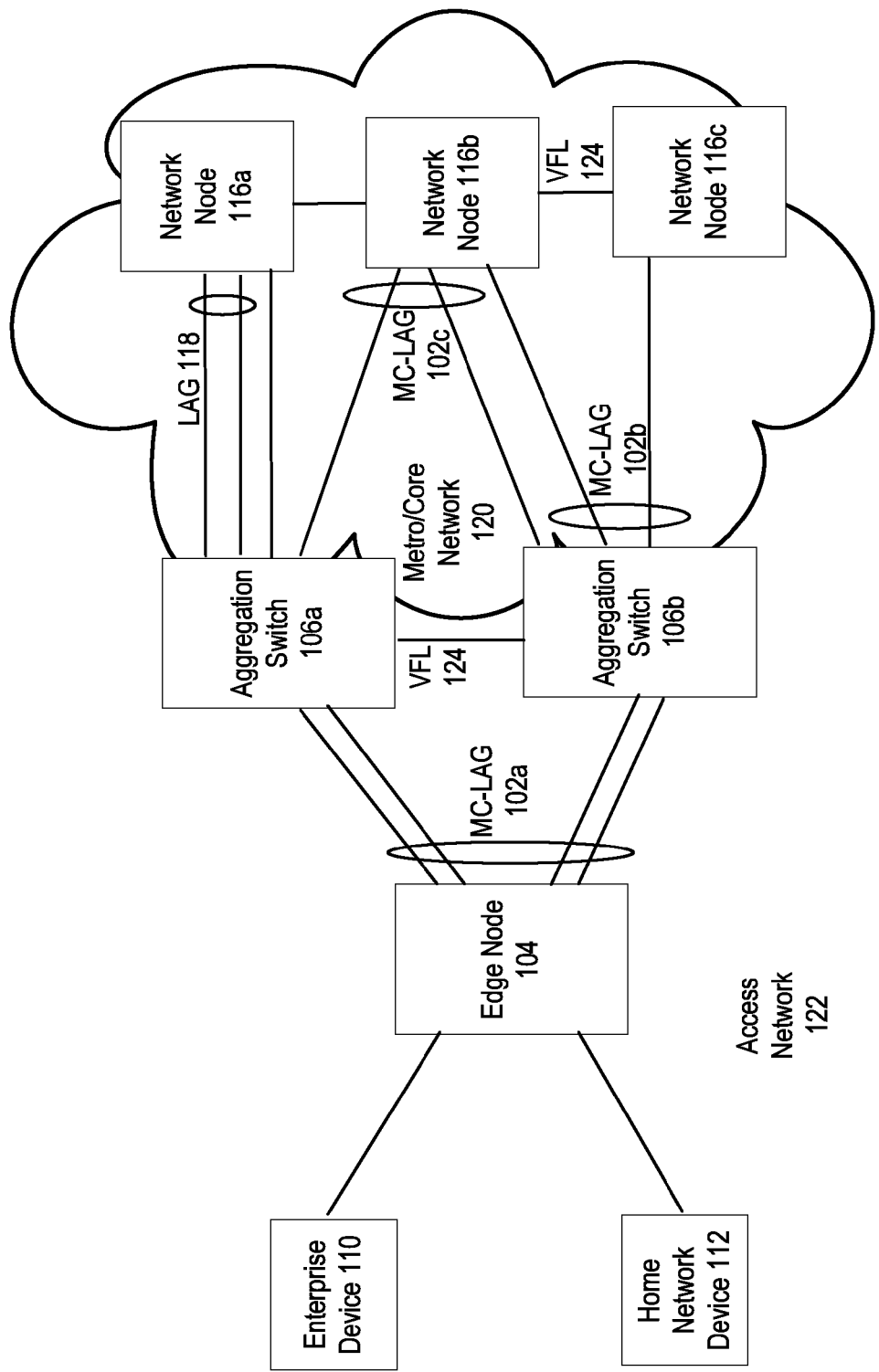
FIG. 1 illustrates a schematic block diagram of an embodiment of a network architecture in accordance with the present invention.

FIG. 1 illustrates an embodiment of a resilient network 100 with multi-chassis link aggregation that provides an active/active paradigm (i.e., all links actively forwarding traffic at the same time) that more fully utilizes the capacity of the network nodes. The following abbreviations are herewith defined:

| | |
|---|---|
| CMM | Chassis Management Module |
| IGMP | Internet Group Management Protocol |
| IP | Internet Protocol |
| IPMS | Internet Protocol Multicast |
| LAG | Link Aggregation |
| L2 | Layer 2 ("Data Link Layer") of the OSI model for networks |
| L3 | Layer 3 ("Network Layer") of the OSI model for networks |
| MAC | Media Access Control Protocol |
| MC-LAG | Multi-Chassis Link Aggregate Group |
| MC-VFA | Multi-Chassis Virtual Fabric Aggregation |
| NIM | Network Interface Module |
| STP | Spanning Tree Protocol |
| VLAN | Virtual Local Area Network |
| VRRP | Virtual Router Redundancy Protocol |
| ASIC | Application Specific Integrated Circuit |

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

The LACP provides a method to control the bundling of several physical links, called a link aggregation group (LAG), between two peer nodes to form a single logical channel there between. The peer nodes negotiate the bundling of the physical links into a LAG by exchanging LACP packets, or alternatively the LAG can be configured manually. Link aggregation offers an inexpensive way to transfer more data than any one single port or link can deliver alone. In an embodiment, the ports of a LAG include the same physical type, such as all copper ports (CAT-5E/CAT-6), all multi-mode fiber ports (SX), or all single-mode fiber ports (LX). In another embodiment, the ports of a LAG may have a different physical type.

To provide increased resiliency and remove a single point of failure, a LAG is split across two devices as seen in FIG. 1 and is referred to herein as a multi-chassis link aggregation group (MC-LAG) 102. For example, in FIG. 1, MC-LAG 102a originates from edge node 104 and is split into two subsets and connected to two Aggregation Switches 106a and 106b, with one or more physical links of the MC-LAG 102a in each subset. In an embodiment, the edge node 104 may use load balancing techniques to distribute traffic across all available links of the MC-LAG 102a. For each packet transmitted over the MC-LAG 102a, one of the physical links is selected based on a load-balancing algorithm (usually involving a hash function operating on the source and destination Internet Protocol (IP) or Media Access Control (MAC) address information). Load balancing across the physical links of the MC-LAG 102a results in a more effective use of bandwidth.

As seen in FIG. 1, the edge node 104 is connected over an access network 122 to an enterprise network device 110, such as a bridge, switch, router, etc., that is operating in a LAN, and/or it may also be connected to a home network device 112, such as a DSL modem, set-top box, optical line terminal, etc. The edge node 104 is a switch or server and may functionally include a digital subscriber line access multiplexer (DSLAM), cable modem termination system (CMTS), optical line terminal (OLT), etc. in an embodiment but may include other types of devices as well.

In an embodiment, the Aggregation Switches 106 are coupled with a virtual fabric link (VFL) 124. The VFL 124 provides a connection for exchange of information between the Aggregation Switches 106 regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of MC-LAG 102a. The Aggregation Switches 106 operate transparently to the edge node 104 and are treated as a single logical device by the edge node 104. The edge node 104 is able to actively forward traffic on the MC-LAG 102a while the synchronization of MAC address tables and other forwarding information between the Aggregation Switches 106 is driven by L2 packet flows over the VFL 124 along with a reduced amount of control messaging in an embodiment. This feature enables dual homing of the edge node 104 to the pair of Aggregation Switches 106 and provides a Layer 2 multi-path intra-structure as well as basic Layer 3 access infra-structure. In addition, in an embodiment, the MC-VFA feature provides this functionality without requiring Layer 2 redundancy protocols (e.g. Spanning Tree) between the edge node 104 and Aggregation Switches 106, while still facilitating a carrier-grade detection and convergence time to edge uplink failures as well as aggregation/core switch failures. Many recent network designs, especially for data centers, are requiring an ever increasing number of layer 2 adjacencies between edge node and Aggregation Switches. This trend is pushing the limits of the spanning tree protocol, such as loop-detection function and convergence times. The spanning tree convergence time can be of up to several seconds in many current network topologies. The multi-chassis architecture in an embodiment provides a dual-homed, layer 2 multi-path connection between the edge node 104 and Aggregation Switches 106 preferably without needing to run the spanning tree protocol operation for loop prevention, while still being flexible enough to allow the spanning tree protocol operation along with the multi-chassis functionality in some of the portions of the network topology in an embodiment (e.g. between the Aggregation Switches over the virtual fabric link as well as over the links connecting these devices to upstream/core switches).

The feature in some embodiments also facilitates fast failover detection and convergence times for access uplink failures, virtual fabric link failures and node failures. Another advantage of the MC-VFA architecture in an embodiment is the active/active forwarding mode of the edge node 104 whereby both sets of operational MC-LAG uplinks are processing traffic to increase efficiency of the use of bandwidth of the MC-LAG links.

As seen in FIG. 1, in an embodiment, the Aggregation Switches 106 are also connected to a metro or core network 120 that includes one or more network nodes 116, such as network switches and/or routers, using the MC-LAG functionality (as part of the M-VFA architecture) as described herein. For example, aggregate switch 106b is connected to network nodes 116b and 116c over MC-LAG 102b wherein the network nodes 116b and 116c exchange state information over a VFL as well. The MC-LAG 102b architecture provides a dual-homed, layer 2 multi-path connection between the aggregation switch 106b and network nodes 116b and 116c. In an embodiment, network nodes 116 can also be connected using MC-LAG functionality, as seen with MC-LAG 102c and VFL 124. The Aggregation Switches 106 may also be connected to the network nodes 116 using a standard LAG, such as LAG 118, or other trunks or links.

Figure 2:
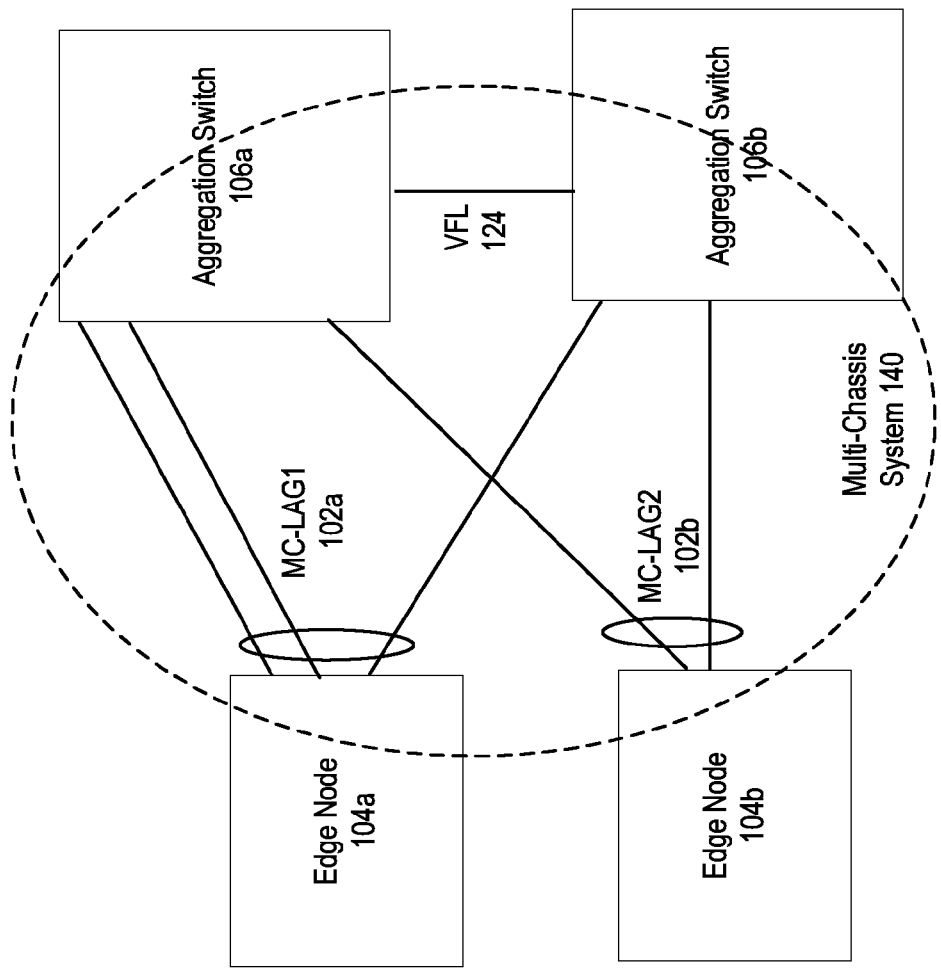
FIG. 2 illustrates a schematic block diagram of an embodiment of a multi-chassis system in accordance with the present invention.

The MC-VFA architecture is now described in more detail with respect to FIG. 2. Edge node 104a is connected to Aggregation Switches 106a and 106b by a first MC-LAG1 102a while edge node 104b is connected to Aggregation Switches 104a and 104b by a second MC-LAG2 102b. Each MC-LAG 102a and 102b includes a plurality of physical links divided into at least two subsets, wherein each of the two subsets includes at least one physical link. As seen in FIG. 2, the first set of MC-LAG1 102a physical links are terminated at a first Aggregation Switch 106a while the second set of MC-LAG1 102a physical links are terminated at a second Aggregation Switch 106b. MC-LAG1 forms logical dual homed, layer 2 multi-paths. The MC-LAG1 member ports are the external, user ports that are members of the MC-LAG1 102a. The VFL 124 is an aggregate of ports that in an embodiment span multiple network interface modules for resiliency and provides for inter-chassis traffic and control/state data transfer. The multi-chassis system 140 includes the Aggregation Switches 106, the virtual fabric link 124, the MC-LAG 102a, the MC-LAG 102b and their respective MC-LAG member ports attached to the downstream Edge Nodes 104a and 104b. The Aggregation Switches 106a and 106b are separate physical switches with each operable as a stand-alone switch and each encased by its own separate physical chassis. The aggregates switches 106a and 106b may be in the same geographic area, such as in a central office or data center, or may be in separate geographic locations, such as different buildings or cities, to provide geo diversity.

The edge nodes 104 operating as MC-LAG clients attached to the Aggregation Switches 106 can use different methods to assign traffic to the links within their aggregates as long as the choice of links remains fixed for a given flow. This ensures that traffic is delivered in-sequence between any pair of communicating end stations. In an embodiment, the same number of uplink ports from the Edge Nodes 104a and 104b to each one of the MC-LAG Aggregation Switches should preferably be configured. In other words, if two uplinks are configured between the edge switch and one of the MC-LAG Aggregation Switches, then two uplinks between the edge switch and the other multi-chassis switch should also be configured. Although not mandatory, this arrangement provides a more homogeneous traffic distribution for flows between the multi-chassis switches and the edge device.

Figure 3:
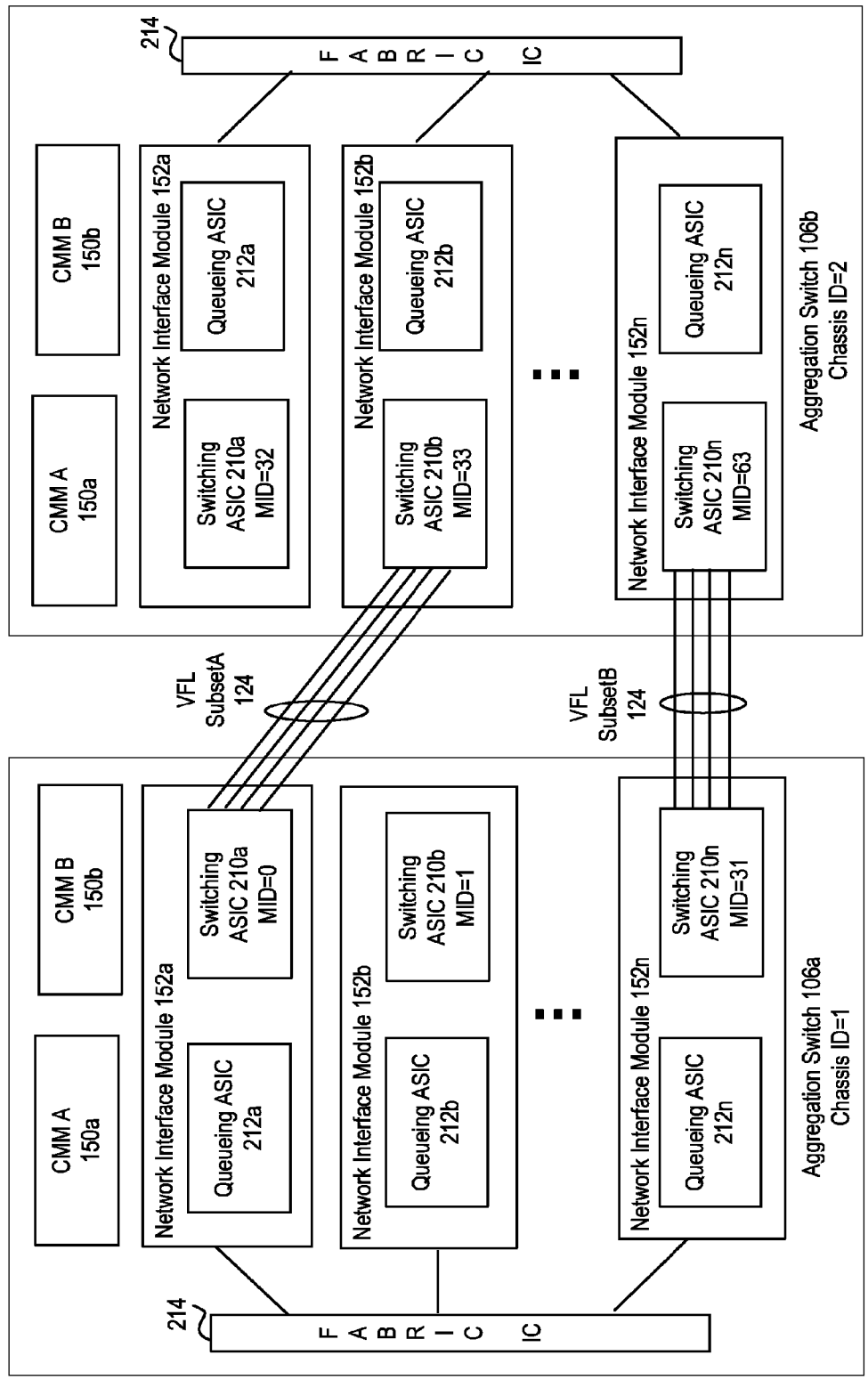
FIG. 3 illustrate a schematic block diagram of an embodiment of Aggregation Switches in a multi-chassis system in accordance with the present invention.

The Virtual fabric link (VFL) 124 between the Aggregation Switches 106 is now described in more detail with respect to FIG. 3. The Aggregation Switches 106 in one embodiment each include at least one CMM module 150a (primary) and preferably a second CMM module 150b (back-up) as well as a plurality of Network Interface modules (NIM) 152, such as line cards or port modules. The VFL 124 is an aggregate of VFL member ports connected to one or more NIMs 152, in the first and second Aggregation Switches 106. For example, VFL 124 includes a first subset A of physical links between NIM 152a of Aggregation Switch 106a and NIM 152b of Aggregation Switch 106b, and a second subset B of physical links between NIMs 152n of Aggregation Switch 106a and 106b. In an embodiment, the VFL links are connected between Switching ASICs 210 residing in the NIMs 152 of the Aggregation Switches 106. The NIMs 152 each also include a Queuing ASIC 212, described further below.

A unique chassis identifier is assigned to each Aggregation Switch 106 in the multi-chassis system. The Chassis ID for each Aggregation Switch 106 is unique and global, e.g. each Aggregation Switch is aware of the chassis ID of its peer Aggregation Switch. Unique hardware device identifiers (MIDs) for various components, such as ASICs, NIM, CMM, in each Aggregation Switch 106 are also generated allowing for management of local and remote objects. In an embodiment, the hardware device identifiers for the Switching ASICs 210 have global significance within the multi-chassis system while MIDs for other components, such as Queuing ASICs 212, may have only local significance. For example, the hardware device identifiers' assigned to the Switching ASICs 210 are known by both Aggregation Switches 106 while hardware device identifiers for other devices are restricted to a local Aggregation Switch and have no significance to the remote Aggregation Switch.

In an embodiment, the Switching ASICs 210 are assigned a global unique hardware device identifier (MID) in a range assigned to its Aggregation Switch, such as:

Aggregation Switch 106a: Chassis ID=1 and MID values 0-31

Aggregation Switch 106b: Chassis ID=2 and MID values 32-63

Exemplary MIDs assigned to Switching ASICs 210 are shown in FIG. 3. By knowing the assigned range, a module is able to determine the location of a Switching ASIC 210 from its MID as in Aggregation Switch 106a or Aggregation Switch 106b.

Figure 4:
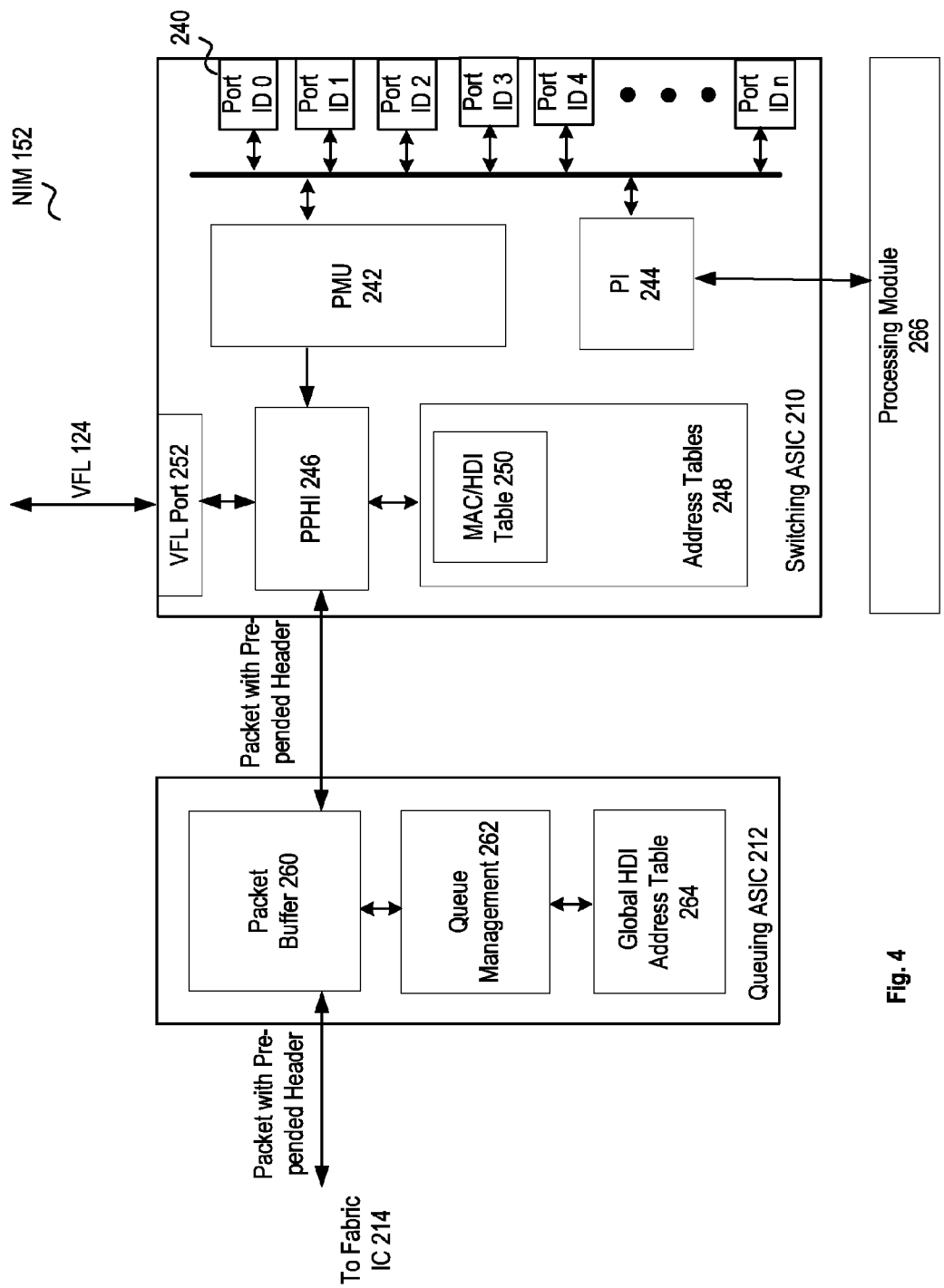
FIG. 4 illustrates a schematic block diagram of an embodiments of a network interface module of an Aggregation Switch in a multi-chassis system in accordance with the present invention.

In an embodiment, the Switching ASICs 210 operates in a pre-pended header mode to exchange data and control packets between the Aggregation Switches 106. FIG. 4 illustrates a schematic block diagram of an embodiment of a network interface module (NIM) 152 in more detail. The Switching ASIC 210 includes a plurality of external port interfaces 240 that are connected to external nodes, such as edge nodes 104a and 104b. One or more of the external port interfaces 240 may include member ports for a MC-LAG physical link, LAG or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned an external port interface identifiers (Port ID), e.g., device port values, such as gport and dport values, associated with the Switching ASICs 210. In an embodiment, MIDs of the Switching ASICs 210 and an external port interface identifiers for external ports 240 on the Switching ASICs 210 are used to uniquely identify a physical external port interface 240 of a Switching ASIC 210 on either the local or remote Aggregation Switch 106 in the multi-chassis system 140. In another embodiment, a Port Manger that includes a conversion module or other entity may convert the MIDs of the Switching ASICs 210 and external port identifiers into a single integer value, to generate a global port value (GPV), e.g. MID 4; device port identifier (dport) 5 converts to GPV 20. In either example, unique external port identifiers for the external ports of NIMs 152 in both the local and remote Aggregation Switches are generated. Unique port identifiers may also be assigned to internal ports of a Switching ASIC 210, such as an internal port from the Switching ASIC 210 to a processing module on the NIM 152. These internal ports are also uniquely identified by the port identifier and the MID of the Switching ASIC.

The Switching ASIC 210 further includes a packet management unit (PMU) 242 that determines a destination address of incoming packets. The packets may be switched to another external port interface 240 of the Switching ASIC 210, to the Queuing ASIC 212 for transmission to another NIM 152 on the local or remote aggregate switch, or to the processor interface (PI) 244 for transmission to a processing module 266 of the NIM 152 external or internal to the Switching ASIC 210.

When a packet is to be transmitted to another NIM 152 on the local or remote Aggregation Switch, in an embodiment, the Switching ASIC 210 transfers the packet to a pre-pended packet header interface (PPHI) 246 that adds or otherwise modifies the packet header to include hardware device information (HDI). The HDI includes identifiers of hardware devices associated with the source and/or the destination of the packet. In an embodiment, the pre-pended header may include other information such as packet priority and load balance identifiers. To obtain destination HDI information, the PPHI performs a look-up process to MAC/HDI forwarding table 250. The MAC/HDI forwarding table 250 stored in the address table memory 248 includes a list of MAC address entries, such as MAC address for external devices, nodes, modules, software or hardware connected to the Aggregation Switch 106. The MAC address entries include associated hardware device information used in bridging or routing a packet to reach a device with the associated MAC address. The destination hardware device information includes, for example, the external port identifier and hardware device identifier MID of a Switching ASIC 210 (e.g. MID=24, port ID=5 or MID=54, device port=12), on either the local or remote Aggregation Switch 106, associated with the destination MAC address. In another embodiment, the destination hardware device information may include the global port value (GPV) of the external port interface associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the Queuing ASIC of the NIM 152 as well.

In an embodiment, when the Switching ASIC 210 includes an active VFL member port 252 with a link to the remote Aggregation Switch, the MAC/HDI forwarding table 250 may include additional HDI information, such as a table to associate gport values into Switching ASIC hardware device identifier MID values and device port values and/or a table with logical aggregate group identifiers mapping to external port interfaces.

In an embodiment, the pre-pended header includes hardware device information HDI associated with the source port, such as an external or internal port interface, including hardware device identifier MID of the Switching ASIC and device port identifier of the source port.

In another embodiment, the pre-pended header includes HDI associated with a Switching ASIC 210 connected to the VFL 124 (such as Switching ASICs MID=0 or MID=31 for Aggregation Switch 106a in FIG. 3). The Switching ASIC 210 connected to the VFL 124 will then translate or convert the HDI in the pre-pended header before transmitting the packet with pre-pended header over the VFL 124.

In an embodiment, the PPHI 246 also appends source hardware device information associated with the source port, e.g. the external port interface 240 that first received the packet. The source hardware device information may include the MID of the Switching ASIC 210 and the port identifier (e.g., device port) and/or global port value (GPV) of the external port interface 240. Additional information, such as destination hardware device identifier or MID, a destination device port, VLAN ID, packet type (multicast, unicast, broadcast), packet priority and load balance identifier is also added to the pre-pended header in an embodiment. In an embodiment, the destination HDI is retrieved from the address tables 248, such as MAC/HDI forwarding table 250.

The packet with the pre-pended header is then transmitted to the Queuing ASIC 212 for routing over the Fabric IC 214. The Queuing ASIC 212 includes a packet buffer 260, a queue management 262 for providing traffic and buffer management and a global HDI address table 264. The global HDI address table 264 maps the destination HDI to the appropriate queues in Queuing ASICs 212 in one or more of the other NIMs 152. For example, the mapping provides information for switching the packet into an appropriate egress queue for one or more of the external port interfaces in other Queuing/Switching ASICs in the Aggregation Switch 106 based on the hardware device information in the pre-pended header. In another example, when the destination HDI indicates a destination on the remote Aggregation Switch (i.e. the destination device identifier belongs to a remote/peer switch range), the Queuing ASIC 212 switches the packet to an appropriate egress queue for one or more of the VFL port interfaces in the local Aggregation Switch 106 for transmission to the remote Aggregation Switch over the VFL 124, e.g. the global HDI address table 264 indicates that the associated hardware device is located on the remote Aggregation Switch. In this scenario, the determination of the egress queue corresponding to a particular VFL port interface is made based on the load balance identifier present in the pre-pended header and inserted previously by the Switching ASIC 210.

Though the switching ASIC 210 and Queuing ASIC 212 are illustrated as separate integrated circuits or modules, one or more functions or components of the ASICs may be included on the other ASIC or combined into an alternate ASIC or otherwise be implemented in one or more integrated circuits.

Figure 5:
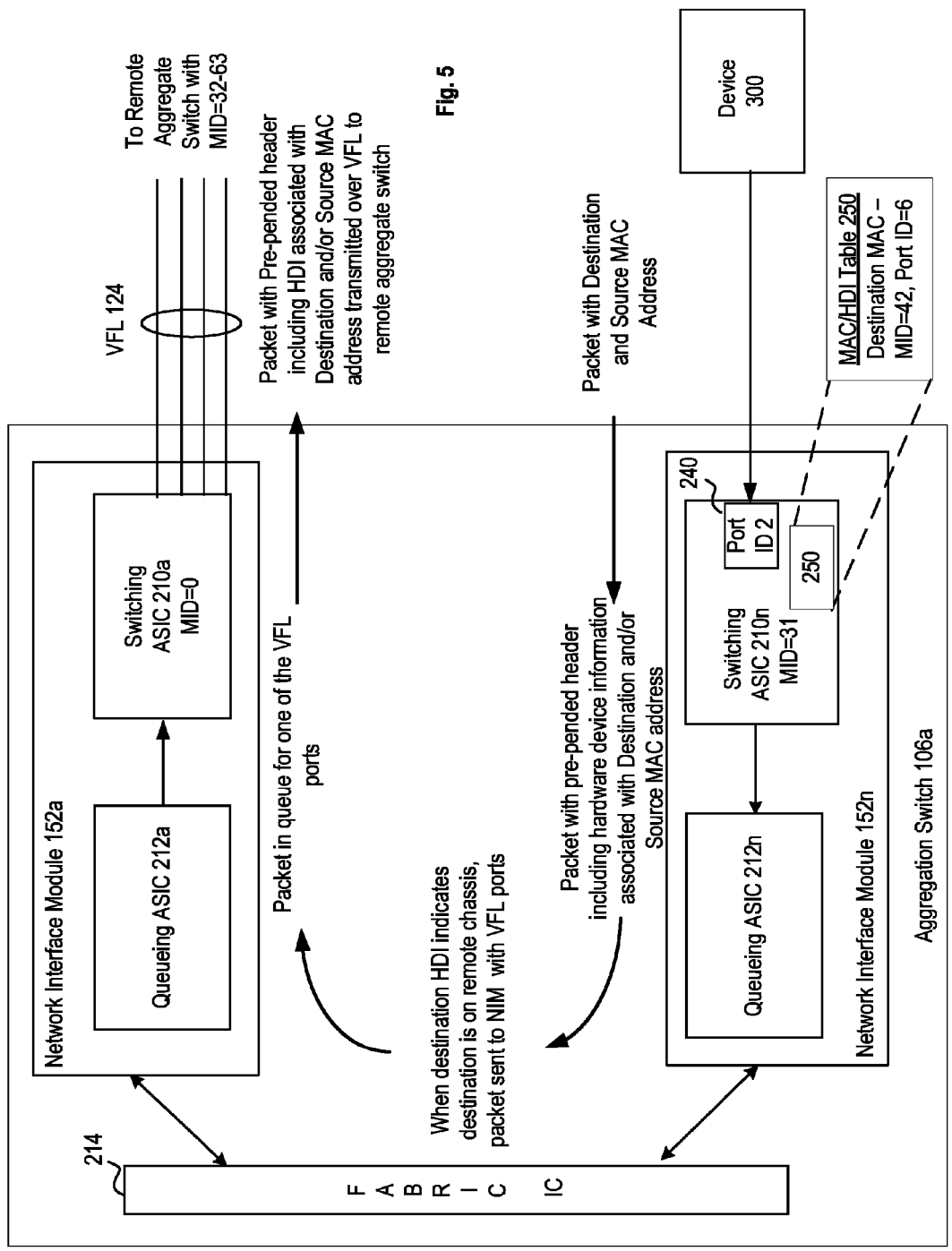
FIG. 5 illustrates a schematic block diagram of an embodiment of packet flow through an Aggregation Switch in a multi-chassis system in accordance with the present invention.

FIG. 5 illustrates a schematic block diagram of an embodiment of a packet flow through Aggregation Switch 106a to VFL 124. In this example, a device 300 with source MAC address, such as enterprise device 110 or home network device 112, transmits a packet, e.g. through edge node 104, to Aggregation Switch 106a with a destination MAC address of a device that may be accessed over an external port interface of the remote Aggregation Switch 106b. Switching ASIC 210n, e.g. with MID=31 in FIG. 5, in NIM 152n receives the packet on an external port interface 240, e.g. with port ID=2. The Switching ASIC 210n extracts a destination MAC address and performs an address table look-up to determine hardware device information (HDI) associated with the destination MAC address from MAC/HDI forwarding table 250. The destination HDI may include, e.g., device module identifiers (MIDs) of one or more hardware components in a path to the destination device with the MAC address, such as NIMs 152, Queuing ASICs 212, Switching ASICS 210, external port identifiers 240, member ports of the VFL 124, of either the local Aggregation Switch 106a or remote Aggregation Switch 106b. In an embodiment, the destination HDI may include the MID of the Switching ASIC 210 and port identifier (e.g., device port) of the external port interface 240 that provides access to the destination device. Furthermore, in an embodiment, the pre-pended header includes a packet priority and a load balance identifier determined based on parameters retrieved from the original packet (source MAC address, destination MAC address, source IP address, destination IP address). In another example, the HDI would include a global port value (GPV) for the external port interface 240 or MID of the NIM 152 that provides access to the destination device. In another embodiment, when the destination MAC address is associated with the remote Aggregation Switch, the HDI may include the hardware device identifier MID for the NIM 152a or Switching ASIC 210 (such as MID=0) connected to the VFL 124. The destination HDI is added to a pre-pended header that adds information to the original packet header (such as a layer 2, Ethernet packet header type). The Switching ASIC 210n also includes source hardware device information (HDI) for one or more devices associated with the originating external port interface, e.g. port ID=2. The source HDI may include one or more hardware device identifiers, such as MID of the originating Switching ASIC 210, source port identifier (e.g. device port), global port value, MID for source NIM 152, Chassis ID, etc.

The packet with pre-pended header is transmitted to the Queuing ASIC 212n which then determines a NIM 152 on the local Aggregation Switch to transmit the packet based on the destination HDI. When the destination HDI indicates a local external port interface on the Aggregation Switch 106a (e.g. based on the destination MID contained in the pre-pended header), the Queuing ASIC 212n places the packet in an egress queue for transmission to the corresponding NIM 152 of the local external port interface. In another example illustrated in FIG. 5, the Queuing ASIC 212n determines that the destination HDI indicates a destination hardware device on the remote Aggregation Switch, e.g. the HDI indicates Switching ASIC with MID=45 on the remote Aggregation Switch. To reach the remote Aggregation Switch, the packet needs to be transmitted over the VFL 124. So the Queuing ASIC 212n transmits the packet with pre-pended header from a queue over the Fabric IC 214 to NIM 152a connected to the VFL 124. The selection of a VFL member port is made based on the load balance identifier parameters carried on the pre-pended header. The Queuing ASIC 212a on NIM 152a receives the packet with pre-pended header and queues the packet for transmission over the VFL 124. The Switching ASIC 210a then transmits the packet with pre-pended header including the source and/or destination HDI to the remote Aggregation Switch over the VFL 124.

In an embodiment, the Switching ASIC 210a may alter the pre-pended header prior to transmission over the VFL 124. For example, the Switching ASCI 210a may translate a destination HDI with local significance (e.g., a gport value or local hardware device identifier MID) to an HDI with global significance. The Switching ASIC 210a then transmits the packet with pre-pended header including the source and/or destination HDI to the remote Aggregation Switch over the VFL 124.

In an embodiment, when multiple Switching ASICs 210 of an Aggregation Switch 106 are connected to the VFL 124, e.g. in FIG. 3, Switching ASICs MID=0 and MID=31, the traffic to be transmitted over the VFL 124 may be distributed as described in further detail with respect to FIGS. 8-11.

In an embodiment, the MAC/HDI forwarding tables in the NIMs 152 are populated and then updated in response to layer 2 packets flow through the system. Since the pre-pended header includes source MAC address and source HDI information, the NIMs 152, e.g. in specific the Switching ASICs 210 in an embodiment, are able to populate the MAC/HDI forwarding table 250 with this information. By operating in a pre-pended header mode to exchange Layer 2 packets with source MAC addresses and source HDI over the VFL 124, the Switching ASICs 210 are able to synchronize MAC address tables between the Aggregation Switches 106. Though the MAC/HDI forwarding table 250 is described in the Switching ASICs 210, the MAC/HDI forwarding table 250 may be included, alternatively or in addition to, in the Queuing ASICs 212n or other module of the NIM 152. In another embodiment, the CMM 150 (primary and secondary) may also include a MAC/HDI forwarding table for one or more types of links between the Aggregation Switches 106.

Figure 6:
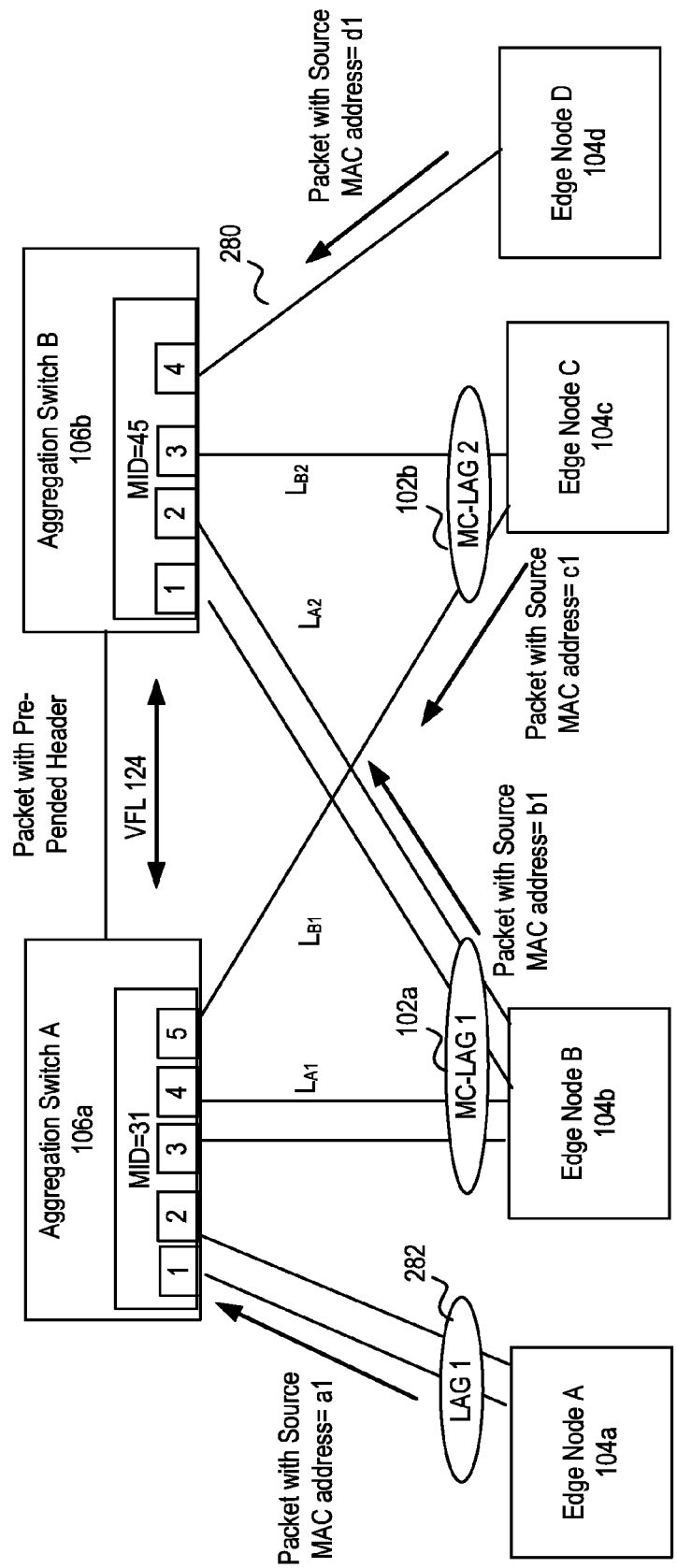
FIG. 6 illustrates a schematic block diagram of an embodiment of source address learning in a multi-chassis system in accordance with the present invention.

FIG. 6 illustrates a schematic block diagram of an embodiment of a multi-chassis system that illustrates source MAC learning. Edge nodes 104 are connected to Aggregation Switches 106a and 106b over logical aggregate group LAG1 282, multi-chassis logical aggregate group MC-LAG1 102a, multi-chassis logical aggregate group MC-LAG2 102b and fixed port link 280. In an embodiment, each Aggregation Switch communicates to the other Aggregation Switch configuration information for logical aggregate groups, such as LAG1 and other types of trunk groups, and hardware device information associated thereto. In an embodiment, the hardware device information includes physical ports associated with the logical aggregate groups, e.g. hardware device or module identifiers (MID) of Switching ASICS and external port identifiers for links associated with the logical aggregate groups (device port values or gport values).

For example, in an embodiment, Aggregation Switch A notifies Aggregation Switch B that the logical aggregate group with aggregate group identifier LAG1 is associated with a Switching ASIC having a hardware device module identifier MID=31 and external port interface with identifier device port=1, 2. Aggregation Switch B notifies Aggregation Switch A that the logical aggregate group with aggregate group identifier MC-LAG1 is associated with a Switching ASIC having hardware device module identifier MID=45 and external port interface identifier device port=1, 2. Other hardware device information, such as identifiers of NIMs, Queuing ASICs, etc. associated with the logical aggregate groups may be exchanged alternatively or in addition to the Switching ASIC's MIDs and device port values. The Aggregation Switches 106 also provide notifications of updates to the configuration information of the logical aggregate groups for both ordinary aggregates and multi-chassis aggregate groups. The hardware device information associated with the logical aggregate groups and multi-chassis aggregates of either of the Aggregation Switches is included in one or more of the MAC/HDI forwarding tables in NIMs 152 on both Aggregation Switches. For example, in an embodiment, one or more of the MAC/HDI forwarding tables in both Aggregation Switches 106 includes the following information:

| Type of Aggregate Group | Aggregate Group Identifier | HDI List of VFL Member Ports |
|---|---|---|
| LAG | LAG1 | (MID = 31, Port ID = 1) |
|  |  | (MID = 31, Port ID = 2) |
| MC-LAG | MC-LAG1 | (MID = 31, Port ID = 3) |
|  |  | (MID = 31, Port ID = 4) |
|  |  | (MID = 45, Port ID = 1) |
|  |  | (MID = 45, Port ID = 2) |
| MC-LAG | MC-LAG2 | (MID = 31, Port ID = 5) |
|  |  | (MID = 45, Port ID = 3) |

Since the same aggregate group identifiers for logical aggregate groups (e.g. LAG1) are known and utilized by both Aggregation Switches 106, in an embodiment, the multi-chassis system assigns a subset of aggregate group identifiers to each type of logical group and for each of the Aggregation Switches 106. For example, in an embodiment with a maximum of 128 possible aggregate groups, an assignment of aggregate group identifiers would include:

| Type of Aggregate Group | Aggregation Switch | Range Configuration | Default | Example |
|---|---|---|---|---|
| LAG | chassis 1 | MIN_LAG_ID_LOCAL MAX_LAG_ID_LOCAL | [0-47] | [0-100] |
| LAG | chassis 2 | MIN_LAG_ID_REMOTE MAX_LAG_ID_REMOTE | [48-95] | [101-120] |
| MC-LAG | Both chassis | MIN_MC-LAG_ID MAX_MC-LAG_ID | [96-127] | [121-127] |

The Aggregation Switches 106 assign aggregate group identifiers based on the assigned ranges and type of aggregate group. As such, packet forwarding in the Aggregation Switches is performed by accessing the MAC/HDI forwarding tables and using the mapping between the logical aggregate groups and hardware device information. Typically, aggregate identifier information is not transferred in the pre-pended headers.

In an embodiment, to facilitate load balancing over a LAG or MC-LAG, when an Aggregation Switch 106 receives a packet over the VFL 124 with destination HDI information, such as (MID, Port ID), the Aggregation Switch 106 determines whether the destination HDI is included in a logical aggregate group by searching for the port identified in the source HDI (destination MID, destination Port identifier) in one or more of its internal trunk tables that contain a list of all ports that are active members of each LAG or MC-LAG aggregate group. When a destination port is found in an associated LAG or MC-LAG, the Aggregation Switch 106 may perform load balancing techniques by assigning the packet to one or more different external port interfaces of the associated LAG. For example, when Switching ASIC 210 connected to the VFL in the remote Aggregation Switch 106b receives a packet with destination HDI of MID=45, port 2, the switching ASIC 210 determines from its MAC/HDI table below, that MID=45, port 2 is part of MC-LAG1 as shown in the example in FIG. 6. The switching ASIC may then decide to perform load balancing and determine through one or more hash algorithms to transmit the packet over MID=45, port 1 of MC-LAG1 instead. In this particular example, the switching ASIC will then strip off the pre-pended header prior to transmitting the packet out of the external port (MID=45, port 1).

| Aggregation Switch A | |
|---|---|
| LAG ID | HDI |
| LAG1 | (MID = 31, Port ID = 1) |
|  | (MID = 31, Port ID = 2) |
| MC-LAG1 | (MID = 31, Port ID = 3) |
|  | (MID = 31, Port ID = 4) |
|  | (MID = 45, Port ID = 1) |
|  | (MID = 45, Port ID = 2) |
| MC-LAG-2 | (MID = 31, Port ID = 5) |
|  | (MID = 45, Port ID = 3) |

Referring back to FIG. 6, various embodiments of methods and implementations therefore are now described for learning source MAC addresses and associated hardware device information (HDI) in a multi-chassis system. First, in an embodiment, for unknown unicast packets ingressing on a configured fixed port of one of the Aggregation Switches (e.g. traffic originating on fixed port 280 with source MAC address=d1), the Source MAC address is populated in MAC/HDI forwarding tables on both Aggregation Switches 106a and 106b as associated with hardware device information (HDI) of the originating configured fixed port (such as MID of Switching ASIC and source port identifier value or gport value of the source port, NIM identifier, or other hardware device ID associated with the source port). As such, in an embodiment, the source MAC address d1 is stored in one or more MAC/HDI forwarding tables of both Aggregation Switch A and Aggregation Switch B with the VLAN ID and HDI associated with the source port, e.g., MID=45, Port ID=4.

Next, in an embodiment, unknown unicast traffic ingressing on a logical aggregate group connected to only one of the Aggregation Switches 106, such as a trunk group or other type of LAG (e.g. traffic originating on LAG1 with source MAC address=a1), the Source MAC address is populated in MAC/HDI forwarding tables on both Aggregation Switches 106a and 106b as associated with the originating logical aggregate group identifier (e.g., LAG1). As such, in an embodiment, the source MAC address a1 received on LAG1 by Aggregation Switch A is stored in one or more MAC/HDI forwarding tables of both the Aggregation Switches 106 with the VLAN ID and logical aggregate group identifier LAG1. In addition, as explained herein, the MAC/HDI forwarding tables of both Aggregation Switches store the hardware device information associated with logical aggregate groups (learned through distribution of configuration information by the CMM 150 module or other control plane process). The MAC/HDI forwarding tables thus include information that MAC address a1 is associated with trunk group identifier LAG1 and HDI information associated with LAG1.

Further, in an embodiment, for unknown unicast traffic ingressing on a MC-LAG member port (e.g. traffic originating on MC-LAG1 or MC-LAG2) of either Aggregation Switch 106, the Source MAC is populated in MAC/HDI forwarding tables as associated with the MC-LAG identifier and HDI information of the local member ports of the MC-LAG. The HDI information of the member ports of the MC-LAG will be the same for the MAC/LAG tables on each Aggregation Switch 106. In other words, both Aggregation Switches are fully aware of the entire list of member ports that are active participants of an MC-LAG aggregate group regardless of whether a member port is local or remote.

By associating member ports of a MC-LAG with a source MAC address, traffic destined to the MAC address through one of the edge nodes 104 is forwarded preferably via the MC-LAG member ports through the shortest path. This path reduces the amount of traffic crossing the VFL 124. In addition, it reduces MAC movement problems in some specific scenarios wherein traffic to and from an edge node 104 takes different paths over the MC-LAG for distinct flows. In the example of FIG. 6 in an embodiment, one or more of the MAC/HDI forwarding tables on the Aggregation Switches 106 includes the following information:

| Aggregation Switch A | | |
|---|---|---|
| MAC | LAG | LAG ID |
| a1 | Yes | LAG1 |
| b1 | Yes | MC-LAG1 |
| c1 | Yes | MC-LAG-2 |
| d1 | No | — |

| Aggregation Switch B | | |
|---|---|---|
| MAC | LAG | LAG ID |
| a1 | Yes | LAG1 |
| b1 | Yes | MC-LAG1 |
| c1 | Yes | MC-LAG-2 |
| d1 | No | — |

In another embodiment, MAC address tables displayed in a node or network management application may not include the HDI for the logical aggregation groups. The user displayed MAC address table may only include HDI for fixed ports and thus are similar for both Aggregation Switches 106.

| Aggregation Switch A | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

| Aggregation Switch B | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

The MAC/HDI forwarding tables are synchronized with respect to the LAG identifiers associated with the source MAC addresses. In addition, VLAN IDs associated with the MAC addresses may also be configured and synchronized on both Aggregation Switches. As such, logically, the Aggregation Switches 106 operate as a single bridge for MAC learning. Furthermore, MAC learning occurs automatically as traffic flows over the VFL 124 with minimum Layer 2/control module management software intervention and without the need for inter-process communication message-based MAC table synchronization.

Figure 7:
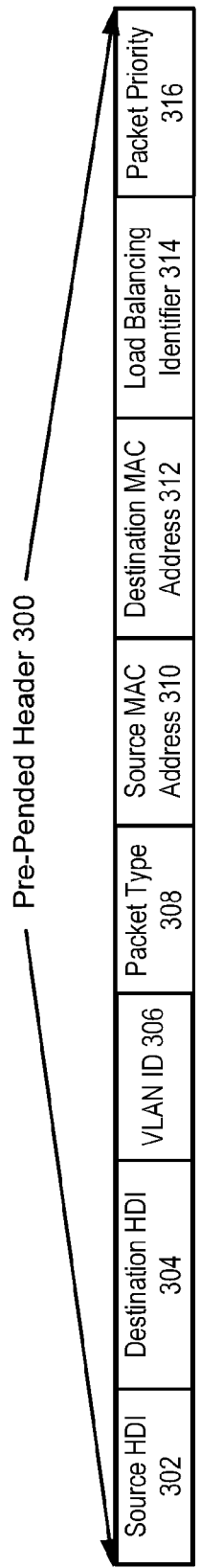
FIG. 7 illustrates a schematic block diagram of an embodiment of a pre-pended header of a packet in the multi-chassis system in accordance with the present invention.

FIG. 7 illustrates a schematic block diagram of an embodiment of a pre-pended header of a packet in the multi-chassis system. The pre-pended header 300 includes fields for source HDI 302, destination HDI 304, VLAN ID 306, packet type 308, source MAC address 310, destination MAC address 312. In an embodiment, the pre-pended header may also include, load balance identifier 314 and packet priority 316. The destination HDI 304 includes, for example, the port identifier and MID of a Switching ASIC 210 (e.g. MID=24, port ID=5 or MID=54, device port=12), of either the local or peer Aggregation Switch, associated with the destination MAC address. In another embodiment, the destination hardware device information may include the global port value (GPV) of the external port interface associated the destination MAC address. The destination hardware device information may also include MID of the Switching ASIC 210 connected to the VFL, NIMs 152, Queuing ASICs, etc. The source HDI 302 may include the MID of the Switching ASIC 210 and the port identifier (e.g., device port) and/or global port value (GPV) of the external port interface 240. The load balance identifier 314 is used to help the Queuing ASIC 212 to decide which VFL member port to be used as a transit/gateway port to reach the peer Aggregate Switch. The packet priority 316 is used by the Queuing ASIC 212 to determine the specific priority queue.

Figure 8:
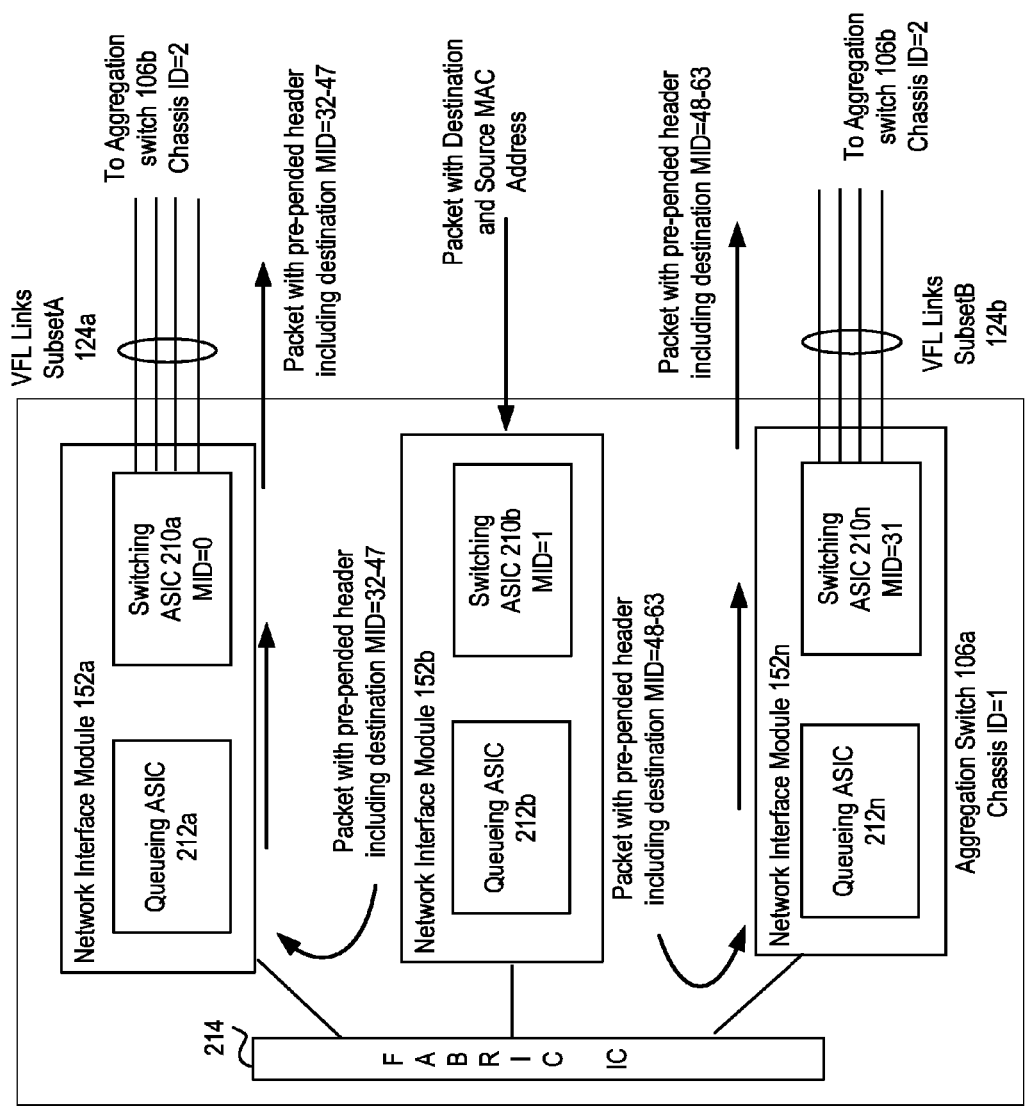
FIG. 8 illustrates a schematic block diagram of an embodiment of traffic distribution over a virtual fabric link (VFL) between Aggregation Switches in a multi-chassis system in accordance with the present invention.

FIG. 8 illustrates a schematic block diagram of an embodiment for traffic distribution in an aggregation switch across the VFL 124 when the physical links of the VFL 124 are separately coupled to two or more NIMs 152 of the Aggregation Switch. For example, in FIG. 8, Switching ASICs 210a and 210n of Aggregation Switch 106a are each connected to a subset of physical links of the VFL 124. This separation of the VFL 124 into two subsets of links, subsetA and subsetB, creates diversity and increases recovery time in case of failure of one of the NIMs 152a or 152n connected to the links of the VFL 124. In an embodiment, the traffic to be transmitted over the VFL 124 is distributed between the subsets of links in response to a destination of the packet flow. For example, Global HDI Address Table 264 of the Queueing ASIC 212 in Aggregate Switch 106a would indicate the following distribution:

| MID's Device Location | Destination MID | Outgoing Port |
|---|---|---|
| Remote | [32-47] | VFL 124a |
| Remote | [48-63] | VFL 124b |

In this embodiment, the Queueing ASIC 212 maps the packets to queues for the VFL 124a or VFL 124b link subsets based on the destination hardware device identifier MID corresponding to a hardware device (such as a Switching ASIC 210) on the remote Aggregation Switch 106b. The hardware device identifiers MIDs for the remote Aggregation Switch 106b are divided into two ranges and each range of MIDs is assigned to one of the link subsets of the VFL 124. For example, as shown in FIG. 8, packets with a destination hardware device identifier in the range of MID=32-47 are transmitted over the link SubsetA of VFL 124a connected to NIM 152a. Packets with a destination hardware device identifier in the range of MID=48-63 are transmitted over the link SubsetB of VFL 124b connected to NIM 152n. With respect to the remote Aggregate Switch 106b, similarly, for example, a Global HDI Address Table 264 of in Queueing ASIC 212 in the remote Aggregate Switch 106b would indicate the following traffic distribution across the VFL for destinations with hardware device identifiers MID=0-31 in Aggregate Switch 106a:

| MID's Device Location | Destination MID | Outgoing Port |
|---|---|---|
| Remote | [0-16] | VFL 124a |
| Remote | [17-31] | VFL 124b |

When the VFL 124 is separated into more than two link subsets, with each link subset connected to a different NIM 152 on a local Aggregation Switch 106, the range of hardware device identifiers MIDs corresponding to hardware devices on the remote Aggregation Switch 106 may be further divided and assigned amongst the link subsets of the VFL 124.

Figure 9:
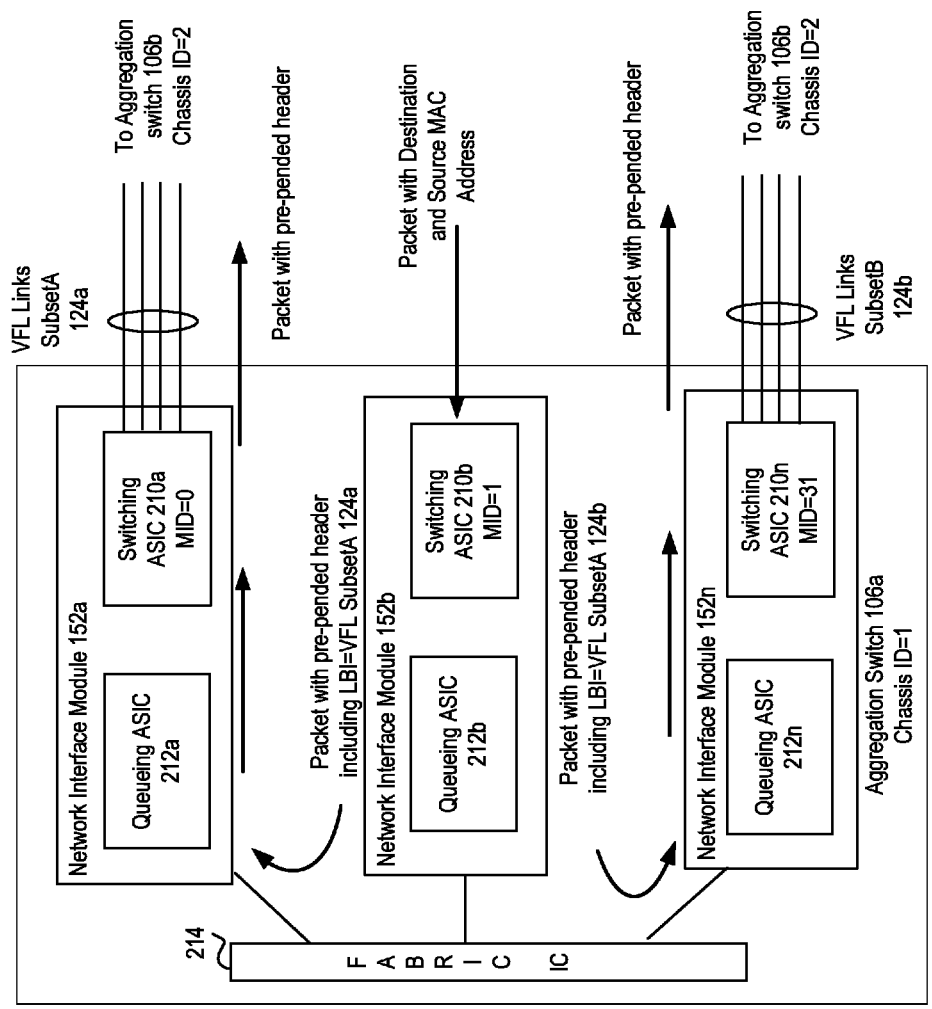
FIG. 9 illustrates a schematic block diagram of another embodiment of traffic distribution over a VFL between Aggregation Switches in a multi-chassis system in accordance with the present invention.
Figure 10:
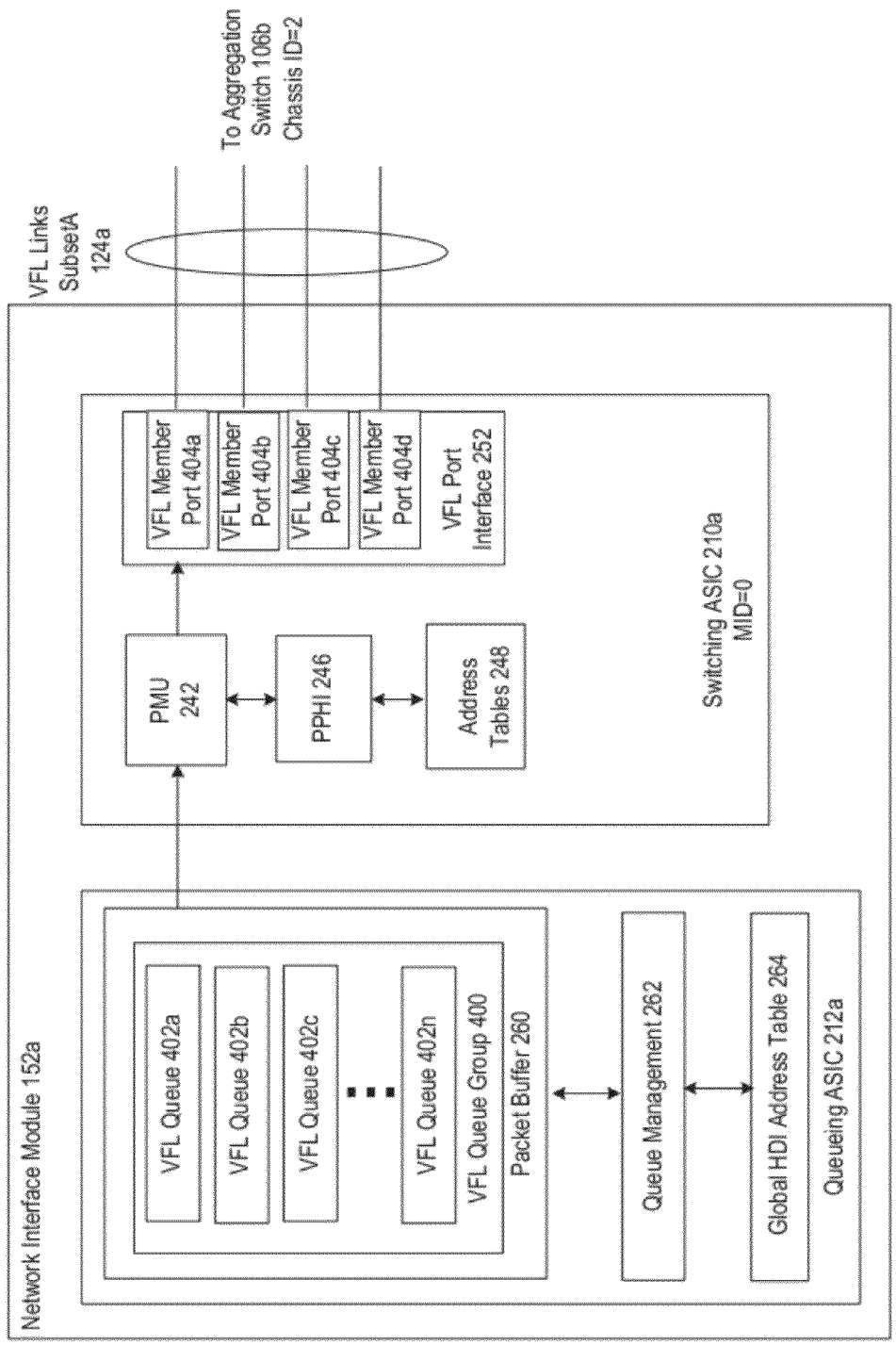
FIG. 10 illustrates a schematic block diagram of another embodiment of a network interface module in an Aggregation Switch in a multi-chassis system in accordance with the present invention.

FIG. 9 illustrates a schematic block diagram of another embodiment for traffic distribution across the VFL 124 of an aggregation switch using the load balance identifier 314 in the pre-pended header 300. In this embodiment, when a Switching ASIC 210 in a NIM 152 determines that a packet has a destination HDI corresponding to a hardware device on the remote Aggregation Switch 106b, the Switching ASIC 210 determines that the packet needs to be transmitted over the VFL 124. The Switching ASIC 210 then determines a load balancing identifier (LBI) 314 based on parameters retrieved from the packet (source MAC address, destination MAC address, source IP address, destination IP address). The Switching ASIC 210 then inserts the load balancing identifier 314 into the pre-prended header of the packet. The Queuing ASIC 212 in the NIM 152 receives the packet with pre-pended header from the Switching ASIC 210 and determines that the packet needs to be transmitted to the remote Aggregation Switch 106b over the VFL 124. The Queuing ASIC 212 switches the packet to a set of egress VFL queues corresponding to one of the subsets of the VFL links (e.g., link SubsetA 124a or link SubsetB 124b) based on the load balancing identifier 314. As such, in this embodiment, the determination of the subset of the VFL links 124a or 124b to switch the packet with pre-pended header is made based on the load balancing identifier 314 in the pre-pended header.

In an embodiment, a packet flow is determined based on parameters retrieved from the packet (such as, including source MAC address, destination MAC address, source IP address, destination IP address). The same load balancing identifier is assigned to each packet in an identified packet flow and inserted into the pre-pended header for each packet in the packet flow.

In an embodiment, a hash function is used to determine the load balancing identifier, wherein the load balancing identifier is a hash identifier in a range, for example, of 0-255. The hash identifiers are each assigned to a subet of links of the VFL (or queues corresponding to such subsets of links). For example, Global HDI Address Table 264 of the Queueing ASIC 212 would indicate the following distribution:

| MID's Device Location | LBI or Hash ID | Outgoing Port |
|---|---|---|
| Remote | [0-127] | VFL 124a |
| Remote | [128-255] | VFL 124b |

For example, as shown in FIG. 9, the Queuing ASIC 212b in the NIM 152b receives a packet with pre-pended header from the Switching ASIC 210b and determines that the packet includes a load balancing identifier (LBI) 314 with a Hash ID in a range of 0-127. The Queuing ASIC 212b then assigns the packet to a set of egress VFL queues corresponding to the link subset of VFL 124a (e.g., VFL SubsetA 124a). When the Queuing ASIC 212b receives a packet with pre-pended header from the Switching ASIC 210b and determines that the packet includes a load balancing identifier (LBI) 314 with a Hash ID in a range of 128-255, the Queuing ASIC 212 then assigns the packet to a set of egress VFL queues corresponding to the link subset of VFL 124b (e.g., VFL SubsetB 124b).

The Queuing ASIC 212b may assign hash identifiers in a round robin fashion, e.g. every other packet flow receives a hash identifier in the same range, such [0-127], for the same link subset of the VFL. Or the Queuing ASIC 212b may consider other factors, such as packet sizes, number of packets in a packet flow, etc. when assigning hash identifiers. In another embodiment, the Queuing ASIC 212b assigns the packet to a particular one of the egress VFL queues corresponding to a link subset, e.g. to one of the plurality of VFL queues for either VFL SubsetA 124a or VFL SubsetB based on the hash identifier.

By using a load balancing identifier 314 for traffic distribution across the VFL 124, the traffic is balanced not based on destination but based on the ingressing packet flows. This traffic distribution (rather than one based on destination HDI) prevents overloading a link subset of a VFL when there are more packet flows to a particular NIM 152 on the remote Aggregation Switch or one or more NIMs 152 are not operational on the remote Aggregation Switch.

FIG. 9 illustrates a schematic block diagram of an embodiment of NIM 152a on Aggregation Switch 106a connected to a subset of links of the VFL 124, i.e. VFL subsetA 124a. The Queuing ASIC 212a includes a VFL queue group 400 that includes egress VFL queues 402a-n, wherein n=8 in this embodiment. Each of the egress VFL queues 402a-n is associated with one of the internal VFL member ports 404a-d. Though four VFL member ports 404a-d are illustrated in this example, additional ports and links may be configured for the VFL 124a in the NIM 152a in different examples. When the Queuing ASIC 212a receives a packet with pre-pended header (e.g., from the Fabric IC 214), the Queue Management module 262 queues the packet into one of the VFL queues 402a-n for transmission over the VFL 124a. In an embodiment, the assignment of packets may be made in a round robin method or using another scheduling algorithm between the VFL queues 402a-n. In another embodiment, the VFL egress queue may be identified in response to the hash identifier in the pre-pended header.

In another embodiment, one or more of the VFL queues 402 may be designated as higher priority queues while one or more of the VFL queues 402 are designated as lower priority queues. When a packet with pre-pended header includes a packet priority field 316 (as shown in FIG. 7), the Queue Management module 262 queues the packet in a VFL queue 402 based on the packet priority.

The packet with pre-pended header is then transmitted to one of the VFL member port 404 associated with the VFL queue 402. The Pre-pended packet header (PPHI) module 246 may remove the load balancing identifier 314 and/or packet priority 316 from the pre-pended header. The packet with pre-pended header is then transmitted over the VFL 124 to an ingress VFL member port on a NIM 152 of the remote Aggregation Switch 106b. The ingress NIM 152 then forwards the packet with pre-pended header to its destination hardware device based on the destination HDI 304 in the pre-pended header.

Figure 11:
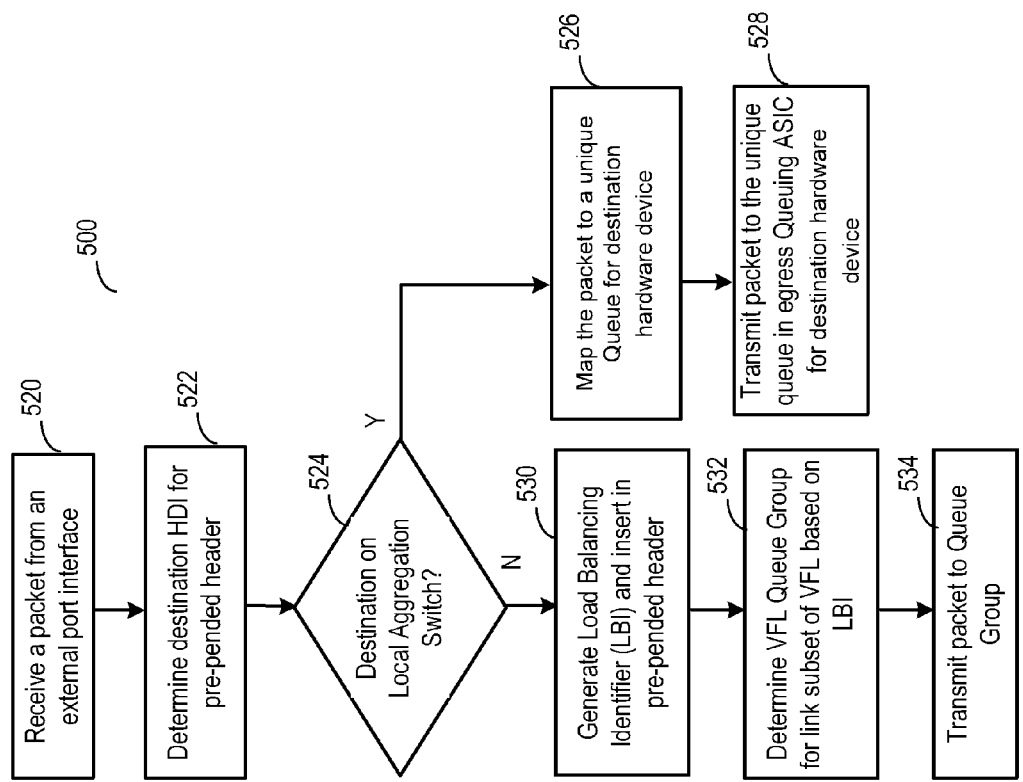
FIG. 11 illustrates a logic block diagram of an embodiment of a method for traffic distribution over a VFL between Aggregation Switches in a multi-chassis system in accordance with the present invention.

FIG. 11 illustrates a logic flow diagram of an embodiment of a method 500 for traffic distribution in an Aggregation Switch in a multi-chassis system. In step 520, a NIM 152 on an Aggregation Switch 106 in a multi-chassis system receives a packet from an external port interface. In step 522, the NIM 152 determines a destination hardware device, either on the local or remote Aggregation Switch in the multi-chassis system, for the packet associated with the destination address (e.g., MAC or other Layer 2 address) and inserts a pre-pended header onto the packet with the destination hardware device information HDI. As described herein, the destination hardware device includes in an embodiment an external port interface 240 on the NIM 152 or other NIM on the local or remote Aggregation Switch. The hardware device information HDI includes a Switching ASIC global device identifier MID and external port identifier.

The NIM 152 determines whether the destination hardware device is on the local or remote Aggregation Switch in step 524. When on the local Aggregation Switch, the NIM 152 maps the packet with pre-pended header to a unique queue associated with the destination hardware device in step 526. The packet with pre-pended header is then transmitted over a Fabric IC to the unique queue (on a Queuing ASIC or other such device) on the destination NIM 152. The packet with pre-pended header is then transmitted to the destination hardware device (such as an external port on a Switching ASIC) from the unique queue in step 528.

When the destination hardware device is on the remote Aggregation Switch, the NIM 152 generates a load balancing identifier (LBI) and inserts the LBI in the pre-pended header along with the destination HDI. The NIM 152 then determines one of a plurality of VFL queue groups 400 (or VFL queues 402) associated with one of a plurality of link subsets of VFL 124 in response to the LBI in step 532. The NIM 152 then transmits the packet to the determined VFL Queue Group 400 (or a particular VFL queue 402) on the NIM 152 connected to the VFL link subset. The packet with pre-pended is then transmitted to a corresponding VFL member port for transmission over the VFL to the remote Aggregation Switch.

The traffic distribution methods described herein are in embodiments for distributing unicast packet flows across the VFL 124. In an embodiment, non-unicast traffic (broadcast, multicast, etc.) are distributed across the VFL 124 using alternate traffic distribution methods. For example, in an embodiment, a primary subset of VFL links is designated, e.g. either VFL subsetA 124a or VFL subset 124b. Only the primary subset of VFL links floods the non-unicast packets (with pre-pended headers) towards the remote Aggregation Switch.

The embodiments described herein provide a system and method for traffic distribution across a plurality of subsets of VFL links. In an embodiment, the traffic distribution is based on destination hardware device information while in another embodiment, traffic distribution is based on the ingressing packet flows. This traffic distribution (rather than one based on destination HDI) prevents overloading a subset of VFL links when there are more packet flows to a particular NIM on the remote Aggregation Switch or one or more NIMs are not operational on the remote Aggregation Switch.

The network interface modules 152 includes one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The NIMs 152 includes a memory that is an internal memory or an external memory. The memory of the NIMs 152 may be a single memory device or a plurality of memory devices. Such a memory device may be a read-only memory, random access memory, volatile memory, non-volatile memory, static memory, dynamic memory, flash memory, cache memory, and/or any device that stores digital information. The NIMs 152 may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The NIMs 152 may execute hard-coded and/or software and/or operational instructions stored by the internal memory and/or external memory to perform the steps and/or functions described herein. The NIMs 152 may be implemented in a single or in one or more integrated circuits.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. An aggregation switch in a multi-chassis system, comprising:
  a virtual fabric link (VFL) connected to a remote aggregation switch, wherein the remote aggregation switch is in a separate physical chassis and wherein the virtual fabric link includes a first subset of VFL links and a second subset of VFL links;
  a first network interface module connected to the remote aggregation switch over the first subset of VFL links;
  a second network interface module connected to remote aggregation switch over the second subset of VFL links;
  a third network interface module operable to:
    receive an incoming packet on one of a plurality of external port interfaces, wherein the packet includes a destination address;
    access at least one forwarding address table that includes a mapping of addresses to hardware device information associated with the remote aggregation switch;
    determine destination hardware device information corresponding to a hardware device on the remote aggregation switch based on the destination address of the incoming packet and the at least one forwarding table;
    generate a load balancing identifier;
    generate a packet with pre-pended header from the incoming packet, wherein the pre-pended header includes the destination hardware device information and the load balancing identifier; and
    map the packet with pre-pended header to first network interface module when the load balancing identifier is associated with the first subset of VFL links and map the packet with pre-pended header to the second network interface module when the load balancing identifier is associated with the second subset of VFL links.

2. The aggregation switch of claim 1, wherein the third network interface module generates the load balancing identifier based on the destination address and a source address in the incoming packet.

3. The aggregation switch of claim 2, wherein the third network interface module determines whether the packet is included in a packet flow and generates the same load balancing identifier for each packet in the packet flow.

4. The aggregation switch of claim 3, wherein when the first network interface module receives the packet with pre-pended from the third network interface module, the first network interface module is operable to remove the load balancing identifier from the pre-pended header and transmit the packet with pre-pended header to the remote aggregation switch over the first subset of VFL links.

5. The aggregation switch of claim 4, wherein the first network interface module includes:
  a plurality of VFL queues, wherein each of the plurality of VFL queues corresponds to at least one VFL link in the first subset of VFL links; and
  a queue management module determines one of the plurality of VFL queues to queue the packet with pre-pended header.

6. The aggregation switch of claim 5, wherein the queue management module determines one of the plurality of VFL queues based on a packet priority field in the pre-pended header of the packet.

7. The aggregation switch of claim 6, wherein the third network interface module comprises:
  a switching circuit that includes the plurality of external port interfaces, wherein the switching circuit determines the load balancing identifier; and
  a queuing circuit that includes a queue management module that determines wither to map the packet with pre-pended header to the first network interface module and the second network interface module based on the load balancing identifier.

8. The aggregation switch of claim 7, wherein the switching circuit is operable to:
  access the at least one forwarding address table, wherein the at least one forwarding address table includes a mapping of destination MAC addresses to hardware device information;
  determine destination hardware device information for the incoming packet based on the destination address of the incoming packet and the at least one forwarding address table; and
  generate the load balancing identifier when the destination hardware device information includes a hardware device identifier in a range assigned to the remote aggregation switch.

9. The aggregation switch of claim 8, wherein the switching circuit further includes:
  a pre-pended packet header interface (PPHI) operable to generate the packet with pre-pended header, wherein the pre-pended header includes the destination hardware device information, load balancing identifier and source hardware device information.

10. The aggregation switch of claim 9, wherein the destination hardware device information includes an identifier for a remote external port interface and an identifier for a remote switching circuit on the remote aggregation switch.

11. A method for traffic distribution in an aggregation switch over a virtual fabric link (VFL) connected to a remote aggregation switch, wherein the remote aggregation switch is in a separate physical chassis and wherein the virtual fabric link includes a first subset of VFL links and a second subset of VFL links, the method comprising:
  receiving an incoming packet on one of a plurality of external port interfaces, wherein the packet includes a destination address;
  determining destination hardware device information based on the destination address of the incoming packet, wherein the destination hardware device information corresponds to a hardware device on the remote aggregation switch;
  generating a load balancing identifier;
  generating a packet with pre-pended header from the incoming packet, wherein the pre-pended header includes the destination hardware device information and the load balancing identifier;
  determining one of a plurality of VFL queues to transmit the packet with pre-pended header based on the load balancing identifier, wherein each of the plurality of VFL queues corresponds to at least one VFL link in either the first subset of VFL links or the second subset of VFL links;
  removing the load balancing identifier from the pre-pended header; and transmitting the packet with pre-pended header to the remote aggregation switch.

12. The method of claim 11, wherein generating the load balancing identifier includes generating the load balancing identifier based on the destination address and a source address in the incoming packet.

13. The method of claim 12, wherein generating the load balancing identifier includes:

determining whether the packet is included in a packet flow; and generating the same load balancing identifier for each packet in the packet flow.

14. The method of claim 13, wherein determining one of a plurality of VFL queues includes determining one of the plurality of VFL queues based on a packet priority field in the pre-pended header of the packet.

15. The method of claim 14, wherein determining the destination hardware device information, further comprises:

accessing a forwarding address table that includes a mapping of destination MAC addresses to hardware device information;

determining destination hardware device information for the incoming packet based on the destination address of the incoming packet and the forwarding address table.

16. The method of claim 14, wherein generating the load balancing identifier, further comprises:

generating the load balancing identifier when the destination hardware device information includes a hardware device identifier in a range assigned to the remote aggregation switch.

17. The method of claim 16, wherein the pre-pended header includes the destination hardware device information, load balancing identifier and source hardware device information.

18. An aggregation switch in a multi-chassis system, comprising:

a virtual fabric link (VFL) connected to a remote aggregation switch, wherein the remote aggregation switch is in a separate physical chassis and wherein the virtual fabric link includes a first subset of VFL links and a second subset of VFL links;

a first network interface module connected to the remote aggregation switch over the first subset of VFL links;

a second network interface module connected to remote aggregation switch over the second subset of VFL links;

a third network interface module operable to:

receive an incoming packet on one of a plurality of external port interfaces, wherein the packet includes a destination address;

determine destination hardware device information corresponding to a hardware device on the remote aggregation switch based on the destination address of the incoming packet;

generate a load balancing identifier;

generate a packet with pre-pended header from the incoming packet, wherein the pre-pended header includes the destination hardware device information and the load balancing identifier; and map the packet with pre-pended header to the first network interface module when the load balancing identifier is associated with the first subset of VFL links and map the packet with pre-pended header to the second network interface module when the load balancing identifier is associated with the second subset of VFL links; and wherein when the first network interface module receives the packet with pre-pended from the third network interface module, the first network interface module is operable to remove the load balancing identifier from the pre-pended header and transmit the packet with pre-pended header to the remote aggregation switch over the first subset of VFL links.

19. The aggregation switch of claim 18, wherein the third network interface module generates the load balancing identifier based on the destination address and a source address in the incoming packet.

20. The aggregation switch of claim 18, wherein the third network interface module is operable to determine destination hardware device information corresponding to a hardware device on the remote aggregation switch based on the destination address of the incoming packet by:

accessing at least one forwarding address table, wherein the at least one forwarding address table includes a mapping of destination addresses to hardware device information;

determining the destination hardware device information for the incoming packet based on the destination address of the incoming packet and the at least one forwarding address table; and generating the load balancing identifier when the destination hardware device information includes a hardware device identifier in a range assigned to the remote aggregation switch.

* * * * *